(12) United States Patent
Babala et al.

(10) Patent No.: US 6,506,069 B2
(45) Date of Patent: Jan. 14, 2003

(54) FLOATING ELECTRICAL CONNECTOR FOR A PRESSURE SENSOR

(75) Inventors: Michael Babala, Plymouth, MI (US); Thomas Baron, Leimbach (DE); Marc Bolitho, Linden, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/851,189

(22) Filed: May 8, 2001

(65) Prior Publication Data

US 2002/0098730 A1 Jul. 25, 2002

Related U.S. Application Data

(60) Provisional application No. 60/264,178, filed on Jan. 25, 2001.

(51) Int. Cl.[7] ............................................. H01R 13/64
(52) U.S. Cl. ......................................... 439/248; 439/67
(58) Field of Search ................................ 439/248, 247, 439/76.1, 67

(56) References Cited

U.S. PATENT DOCUMENTS

| | | | |
|---|---|---|---|
| 3,094,364 A | * | 6/1963 | Lingg ....................... 285/154.1 |
| 4,909,748 A | * | 3/1990 | Kozono et al. ............. 439/247 |
| 4,988,305 A | | 1/1991 | Svenkeson et al. ........... 439/65 |
| 5,060,108 A | | 10/1991 | Baker et al. ................ 361/283 |
| 5,329,819 A | | 7/1994 | Park et al. .................... 73/724 |
| 5,382,169 A | | 1/1995 | Bailey et al. ................ 439/76 |
| 5,407,363 A | * | 4/1995 | Polgar et al. .......... 248/222.52 |
| 5,516,303 A | * | 5/1996 | Yohn et al. ................. 439/248 |
| 5,645,433 A | | 7/1997 | Johnson ....................... 439/66 |
| 5,656,780 A | | 8/1997 | Park ............................ 73/724 |
| 5,744,759 A | | 4/1998 | Ameen et al. ............... 174/260 |
| 5,746,617 A | * | 5/1998 | Porter et al. ................ 439/248 |
| 5,769,652 A | * | 6/1998 | Wider ........................ 439/248 |
| 5,888,093 A | * | 3/1999 | Polgar et al. ............... 439/248 |
| 6,007,162 A | | 12/1999 | Hinz et al. ................ 303/119.3 |
| 6,209,399 B1 | | 4/2001 | Probst et al. ................. 73/756 |

FOREIGN PATENT DOCUMENTS

EP      0 570 624 A2     11/1993

* cited by examiner

*Primary Examiner*—Tulsidas Patel
(74) *Attorney, Agent, or Firm*—MacMillan, Sobanski & Todd, LLC

(57) ABSTRACT

An electrical connector is mounted within an end of a cylindrical pressure sensor housing. The connector has a base that is disc-shaped with a diameter that is less than the diameter of the housing to allow the connector to move within the housing in a direction perpendicular to the axis of the housing. A piece of flex circuit connects conductors carried on the connector base to other electrical components within the pressure sensor while allowing the base to move.

17 Claims, 7 Drawing Sheets

FLOATING ELECTRICAL CONNECTOR FOR A PRESSURE SENSOR

CROSS REFERENCE TO RELATED APPLICATIONS

This application claims the benefit of U.S. Provisional Application No. 60/264,178, filed Jan. 25, 2001.

BACKGROUND OF THE INVENTION

This invention relates in general to pressure sensors and in particular to an electrical connector for a pressure sensor having movable electrical contacts that compensate for the stack up of tolerances of connected components.

An anti-lock brake system (ABS) is often included as standard equipment on new vehicles. When actuated, the ABS is operative to control the operation of some or all of the vehicle wheel brakes. A typical ABS, which controls all four vehicle wheels, includes a plurality of normally open and normally closed solenoid valves which are mounted within a control valve body and connected to the vehicle hydraulic brake system. A separate hydraulic source, such as a motor driven pump, is included in the ABS for reapplying hydraulic pressure to the controlled wheel brakes during an ABS braking cycle. The pump is typically included within the control valve body while the pump motor is mounted upon the exterior of the control valve body. A pressure sensor mounted upon the control valve body monitors the pressure generated by the vehicle master cylinder.

It is also known to provide an ABS for the rear wheels only. Such a system is commonly referred to as a rear wheel anti-lock brake system (RWABS). Typically, RWAL does not include a motor driver pump, but utilizes the vehicle master brake cylinder as a source of pressurized brake fluid. While RWABS has a limited volume of pressurized brake fluid available during an ABS braking cycle, elimination of the pump and pump motor simplifies the system while reducing the cost thereof. plurality of solenoid coils associated with the solenoid valves and one or more wheel speed sensors for monitoring the speed and deceleration of the controlled wheels. Additionally, the control module is electrically coupled through a connector to the pressure sensor. The control module is typically mounted within a removable housing which is attached to the control valve body to form a compact unit which is often referred to as an ABS Electro-hydraulic Control Unit (ECU).

It is known to mount the coils for actuating the solenoid coils within the control module housing. Tubular sleeves which enclose the valve armatures extend from the valve body, forming a seal for the hydraulic brake circuit. When the control module housing is mounted upon the valve body, each of sleeves is received by an associated solenoid coil. Accordingly, the housing can be removed from the valve body for servicing of the control module electronics without opening the hydraulic brake circuit.

During vehicle operation, the microprocessor in the ABS control module continuously receives wheel speed signals from the wheel speed sensors and pressure signals from the pressure sensor. The microprocessor monitors the wheel speed signals and pressure signals for potential wheel lock-up conditions. When the vehicle brakes are applied and the microprocessor senses an impending wheel lock-up condition, the microprocessor is operative to actuate the pump motor, in a four wheel ABS. The microprocessor also is operable to selectively operate the solenoid valves in the valve body to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle as desired by the driver.

Referring now to the drawings, there is illustrated, in FIG. 1, a typical prior art pressure sensor 10. The sensor 10 includes a generally cylindrical base 12 having a central axial bore 14 formed therein. The sensor 10 is mounted upon a control valve body 16 with the central bore 14 communicating with a control valve passageway 18 that is connected to the brake system master cylinder (not shown). An O-ring 20 is mounted upon the exterior of the base 12 to provide a seal between the sensor 10 and the control valve body 16. The upper end of the bore 14 terminates in a diaphragm 22.

The base 12 carries a central sensor portion 24 which typically includes a strain gauge type pressure sensing device 26 that uses resistive technology arranged in a full or half bridge configuration. The pressure sensing device 26 is mounted upon the upper surface of the diaphragm 22. The sensor central bore 14 receives pressurized brake fluid that presses against the lower surface of the diaphragm 22. The pressurized brake fluid slightly deflects the diaphragm 22, generating strains within the diaphragm 22. The strains are detected by the pressure sensing device 26 and converted into an electrical pressure signal. When the pressure within the central bore 14 changes, additional strains are developed in the diaphragm 22 and are detected by the pressure sensing device 26.

The central portion 24 of the sensor 10 also can include a Printed Circuit Board (PCB) 28 which carries an electronic circuit 30 for conditioning the pressure signals generated by the pressure sensing device 26. While the sensor 10 has been described and illustrated as having a resistive strain gauge type of pressure sensing device 26, it will be appreciated that the sensor 10 also can include other types of pressure sensing devices, such as, for example, a capacitive type of pressure sensing device (not shown).

The pressure sensor 10 further includes a cylindrical outer housing 32 that carries a male electrical connector 34. The electrical connector includes a disc-shaped base 36 that is crimped into the upper end of the outer housing 32. As shown in FIG. 1, a pair of pin connectors 38 extend through the connector base 36. While two pin connectors 38 are shown in FIG. 1, it will be appreciated that the sensor 10 also can have more or less pin connectors. Alternately, blade connectors (not shown) may be utilized. The lower ends of the pin connectors 38 extend through the printed circuit board 28 and are electrically connected to the electronic circuit 30. A corresponding female connector 40 is mounted upon the bottom surface of a control module PCB 42. The female connector 40 includes a base portion 44 that carries a pair of female connector sleeves 45. A portion of each of the connector sleeves 45 extends through the control module PCB 42 and is electrically connected to conductive traces (not shown) deposited upon the upper surface of the PCB 42. As illustrated in FIG. 1, the upper ends of the pin connectors 38 extend into, and make electrical contact with, the sleeves 45. The control module PCB 42 is carried by a control module housing (not shown). As described above, the control module housing is removeably mounted upon the control valve body 16. Upon removal of the control module from the control valve body 16, the male and female connectors 34 and 40 are separated.

SUMMARY OF THE INVENTION

This invention relates to an electrical connector for a pressure sensor having movable electrical contacts that compensate for the stack up of tolerances of connected components.

As explained above, it is desirable to be able to remove the electronic control module from a control valve body. To enable removable, a two piece electrical connector is provided between the pressure sensor 10 mounted upon the control valve body 16 and the PCB 44 carried by the electronic control module. However, the lower portion of the electrical connector is rigidly attached to the pressure sensor 10 that is mounted upon the control valve body 16 while the upper portion of the electrical connector is attached to the PCB 44 that is carried by the electronic control module housing. Accordingly, the stack up of tolerances of the components could cause misalignment of the upper and lower portions, 40 and 34, of the electrical connector and thereby actually prevent assembly of the electronic control module onto the control valve body 16. Therefore, it would be desirable to provide an improved pressure sensor having a connector that could accommodate the stack up of component tolerances.

The present invention contemplates an electrical connector that includes a cylindrical outer housing having an inside diameter and an inner housing having a disc shaped base portion disposed within the outer housing. The inner housing base portion has a diameter that is less than the inside diameter of said outer housing so that the inner housing is movable relative to the outer housing. The connector also has at least one electrical conductor carried by the inner housing.

It is further contemplated that the electrical connector outer housing has an end that extends in an inward radial direction to form a flange with the flange defining an aperture in an end of the outer housing. The flange extends over a portion of the inner housing base portion to retain the inner housing within said outer housing. Also, the inner housing includes a conductor portion that extends axially from the inner housing base portion through the outer housing aperture with the conductor portion carrying the electrical conductor.

In the preferred embodiment, the outer housing is included in a pressure sensor. Additionally, a portion of flex circuit that carries at least one conductive trace, is included in the connector. The flex circuit has a first end electrically connected to the inner housing electrical conductor and a second end electrically connected to an electrical component in the pressure sensor.

The invention contemplates that the inner housing is movable in a generally perpendicular direction relative to the axis of the sensor outer housing.

The electrical connector also can include an annular spacer disposed within the sensor outer housing with the spacer slidably contacting the inner housing and cooperating with the outer housing retaining flange to retain the inner housing base portion within the sensor outer housing.

Alternately, a plurality of tabs can be formed in the sensor housing with the tabs extending inward toward the sensor outer housing axis. The tabs co-operate with the outer housing flange to retain the inner housing base portion within the sensor outer housing.

As another alternative structure, the inner housing base portion can include a plurality of tabs formed about the circumference of the base portion with the tabs extending in a radial outward direction from the base portion. The sensor outer housing would then include a plurality of slots formed therethrough that correspond to the base portion tabs. Each of the slots slidably receives one of the base portion tabs to retain the inner housing within the sensor outer housing.

Alternately, the sensor outer housing also can include a first plurality of tabs formed about an end thereof and a second set of tabs formed about the sensor housing end that are axially offset from the first set of tabs. The first and second sets of tabs slidably receive an edge of the base portion of the inner housing therebetween to retain the inner housing within the sensor outer housing.

It is contemplated that the connector is utilized with a pressure sensor that is included in an anti-lock brake system, a traction control system or a vehicle stability control system.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
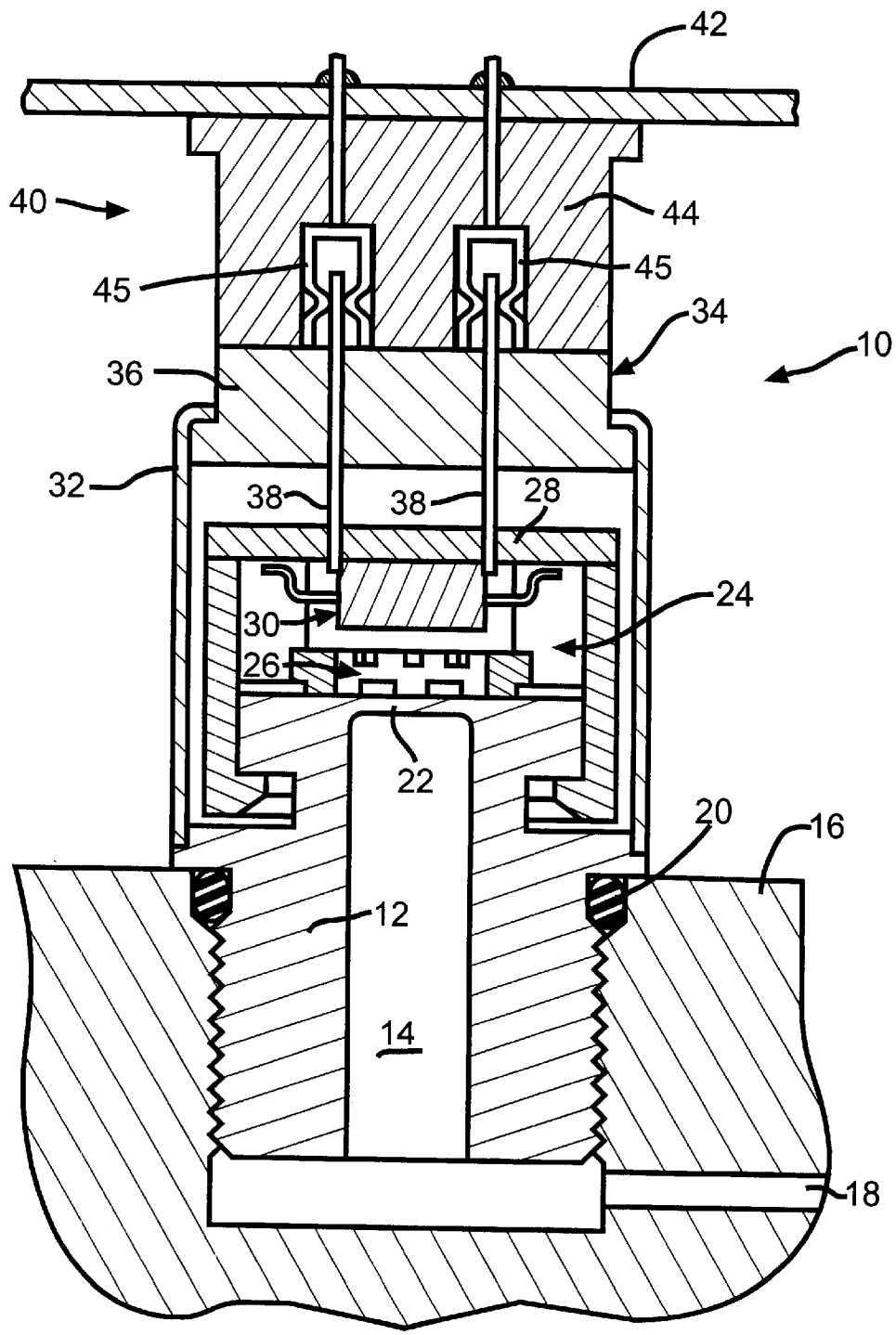
FIG. 1 is a sectional view of a prior art pressure sensor.
Figure 2:
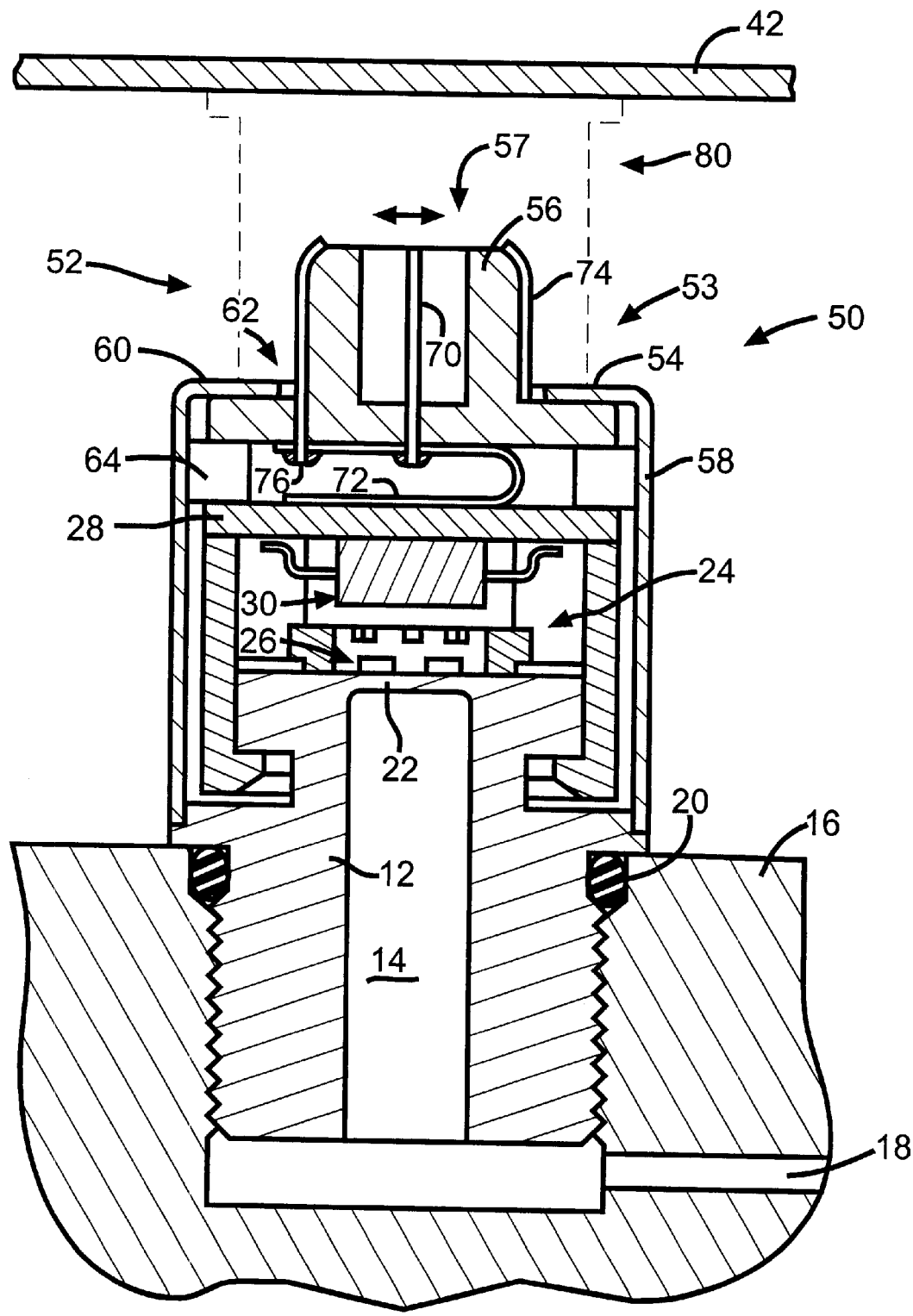
FIG. 2 is a sectional view of a pressure sensor having a male portion of an electrical connector that is in accordance with the invention.

Referring again to the drawings, there is illustrated in FIG. 2, an improved pressure sensor 50 having a floating male electrical connector 52 that is in accordance with the invention. Components shown in FIG. 2 that are similar to components shown in FIG. 1 have the same numerical identifiers. As shown in FIG. 2, the connector 52 includes a housing 53 formed from an electrically insulative material, such as, for example, a plastic. The housing 53 includes a disc-shaped base portion 54 that carries an annular upper portion 56. The annular upper portion 56 defines an axial bore 57. The base portion 54 is disposed within a cylindrical sensor outer housing 58. The diameter of the base portion 54 is less than the inside diameter of the cylindrical sensor outer housing 58. The upper end of the outer housing 58 extends radially inward and over the outer edge of the connector base 54 to form a retaining flange 60. The retaining flange 60 is in sliding contact with the upper surface of the connector housing base portion 54. An aperture 62 is formed through the center of the retaining flange 60. The upper portion 56 of the connector housing 53 extends through the aperture 62. For a reason that will be given below, the diameter of the aperture 62 is greater than the outside diameter of the upper portion 56 of the connector housing 53. The base portion 54 of the connector housing 53 is supported by ring shaped spacer 64 that is disposed between the base portion 54 and the sensor PCB 28. The upper surface of the spacer 64 is in sliding contact with the lower surface of the connector housing base portion 54.

A linear central conductor 70 is disposed axially within the bore 57 formed in the upper portion 56 of the housing 53. The central conductor 70 is formed from an electrically conductive material, such as copper, and may be either solid or a hollow tube. The lower end of the central conductor 70 extends through the base portion 54 of the connector housing 53 and is electrically connected to a first conductive trace (not shown) carried upon a segment of flex circuit 72.

A cylindrical outer conductor 74 that is also formed from an electrically conductive material is carried upon the outside surface of the upper portion 56 of the connector 52. In the preferred embodiment, the outer conductor 74 extends completely around the connector upper portion 56; however, other structures may be utilized for the outer conductor 74. For example, the outer conductor 74 may include a plurality of spaced apart fingers (not shown) that extend axially along the outer surface of the connector upper portion 56. The base of each finger would end in a conductive ring that extends around the connector upper portion 56. To aid establishing an electrical contact, each of the fingers may include a portion that is bent, or crimped, outward from the connector upper portion 56.

A tab 76 extends from the bottom edge of the outer conductor 74 through the base portion 54 of the connector housing 53. The bottom end of the tab 76 is electrically connected to a second conductive trace (not shown) carried upon the segment of flex circuit 74. As shown in FIG. 1, the central conductor 70 and outer conductor 74 co-operate with the connector housing 53 to form a male coaxial connector.

A first end of the flex circuit segment 72 that includes the electrical connections to the central conductor 70 and the outer conductor tab 76 is secured to the bottom surface of the base portion 54 of the connector housing 53. A second end, opposite from the first end of the flex circuit segment 72, is secured to the top surface of the pressure sensor PCB 28. The rest of the flex circuit segment 72 is not secured to a pressure sensor component. As will be described below, this allows the connector 52 to float. The electrical traces on the second end of the flex circuit 72 are connected to electrical vias (not shown) that extend through the sensor PCB 28 and are electrically connected to the sensor signal conditioning circuit 30.

Figure 3:
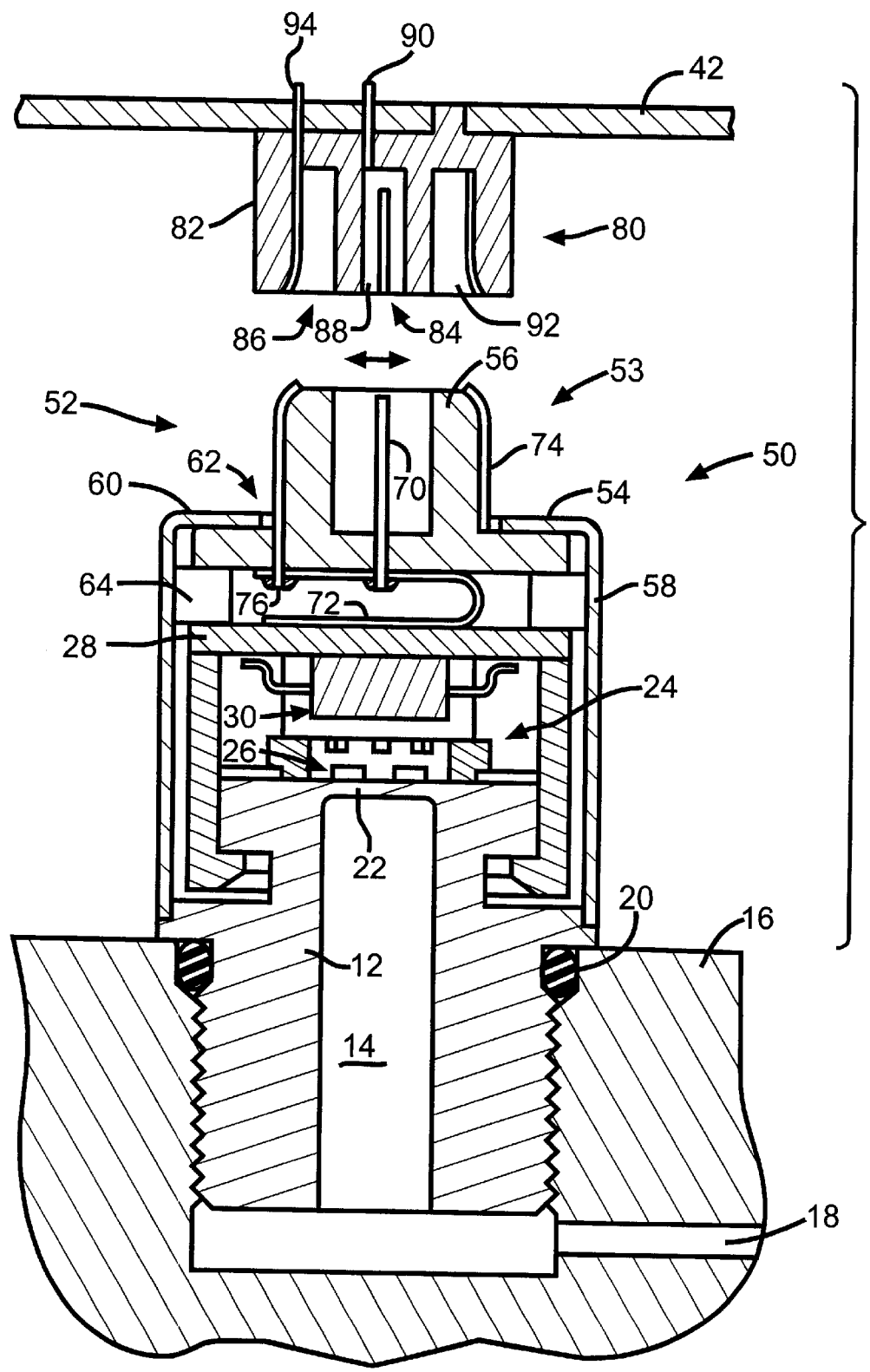
FIG. 3 illustrates the corresponding female portion of the electrical connector shown in FIG. 2.

The connector 50 also includes a corresponding female connector 80 that is carried upon the bottom surface of the electronic control module PCB 42 and is shown in phantom in FIG. 2. In the preferred embodiment, the female connector 80 is a coaxial type connector that receives the male connector 52, as shown in FIG. 3, where the connectors 50 and 80 are separated for clarity. The female connector 80 includes a base 82 that is mounted upon the bottom surface of the electronic control module PCB 42. The base 82 has a central axial bore 84 and an annular channel 86 formed therein. The channel 86 is coaxial with the bore 84.

A first cylindrical electrical conductor 88 is disposed within the central bore 84 and is divided into a plurality of parallel segments that are shaped, or crimped, to extend into the bore 84 to assure an electrical connection with the male connector central conductor 70. A portion 90 of the first conductor 88 extends through the electronic PCB 42 and is electrically connected to the traces disposed upon the top surface of the PCB 42. Similarly, a second segmented electrical connector 92 is disposed within the annular channel 86. Again, the segments of the second conductor 92 are shaped, or crimped, to extend into the channel 86 to assure an electrical connection with the male connector outer conductor 74. A portion 94 of the second conductor 92 also extends through the electronic control module PCB 42 and is electrically connected to the conductive traces disposed upon the top surface of the PCB 42.

The operation of the improved connector 50 will now be described. Upon mounting the electronic control module on the valve body 16, the upper portion 56 of the male connector housing 53 is received by the annular channel 86 of the female connector 80. Similarly, the male central conductor 70 is received in the female connector bore 84. The electrical outer conductor 74 of the male connector 52 makes electrical contact with the second conductor 92 of the female connector 80 while the central conductor 70 of the male connector 52 makes electrical contact with the first conductor 88 of the female connector 80.

As described above, the male connector base portion 54 has a smaller diameter than the inside diameter of the sensor housing 58. Also, the total diameter, to include the outer conductor 74, of the male connector upper portion 56 is smaller than the diameter of the aperture 62 in the sensor housing flange 60. Therefore, the male connector 52 is free to move in any radial direction relative to the sensor housing 58. The radial movement is illustrated by the double ended arrow in FIG. 3 and is facilitated by the sliding contact between the male connector base portion 54 and the surfaces of the spacer 64 and the flange 60. The radial movement of the male connector 52 permits alignment with the female connector 80 and thus compensates for any stack up of component tolerances.

While the preferred embodiment of the connector has been illustrated and described with a coaxial connector, it will be appreciated that the invention also may be practiced with other types-of connectors. Thus, male blade conductors also could be mounted upon the base portion of the connector housing. The male blade conductors would be received by corresponding female conductors while the floating housing would provide alignment of the conductors. Similarly, pin conductors could also be used. Furthermore, while two electrical conductors are shown in the preferred embodiment, the invention also can be practiced with more or less conductors.

Additionally, while the preferred embodiment of the invention has been illustrated and described with a male connector mounted upon the pressure sensor and a corresponding female connector mounted upon the electronic control module PCB, it will be appreciated that the invention also may be practiced with the male connector mounted upon the electronic control module PCB and the female connector mounted upon the sensor.

While the preferred embodiment has been illustrated and described using a cylindrical sensor housing 58, it also will be appreciated that the invention also can be practiced with other housing cross-sectional shapes, such as, for example, square, rectangular or an n-sided polygon. Accordingly, the connector base portion would have a similar shape and be sized to allow movement of the base portion relative to the sensor housing.

Figure 4:
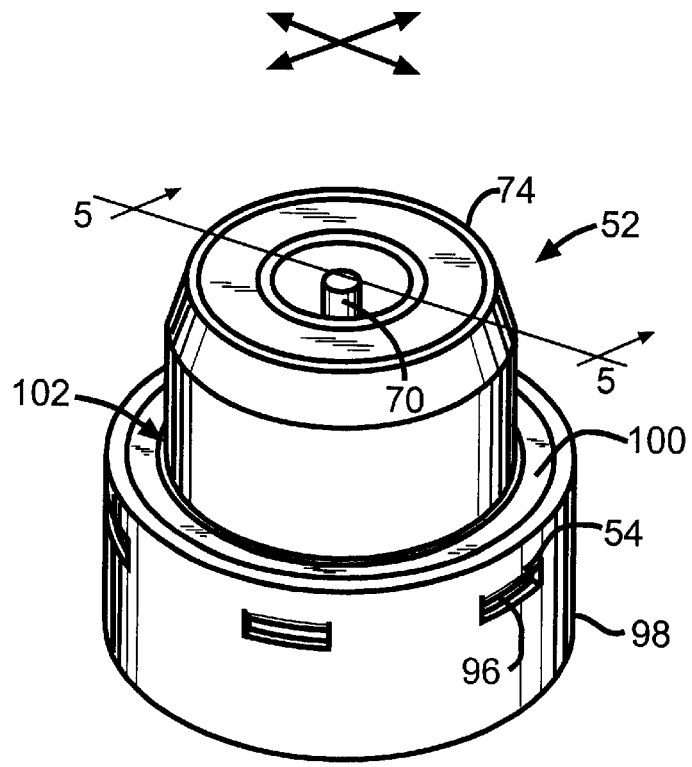
FIG. 4 is a perspective view of an alternate embodiment of the connector shown in FIG. 2.
Figure 5:
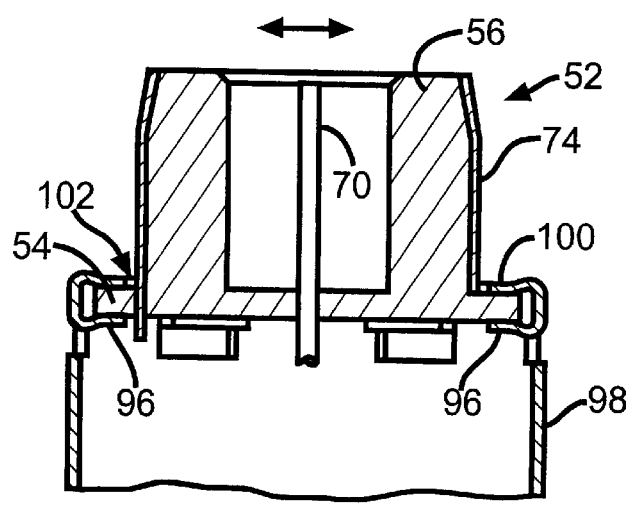
FIG. 5 is a sectional view of the connector taken along line 5—5 in FIG. 4.

The invention also contemplates several alternate embodiments of the male connector with the upper end of the sensor housing modified to retain the male connector without a spacer 64. A first alternate embodiment is illustrated in FIGS. 4 and 5, where components that are similar to components shown in FIG. 3 have the same numerical identifiers. As best seen in FIG. 5, a plurality of tabs 96 are formed in the sensor housing 98. For illustrative purposes, the sensor housing 98 has been shortened from the housing shown in the preceding drawings. As also best seen in FIG. 5, the tabs 96 extend in an inward radial direction and are generally perpendicular to the axis of the housing 98. The tabs 96 support the base of the male connector 50. Similar to the housing 58 described above, the upper end of the housing 98 is formed over the outer edge of the base portion 54 of the connector 52 to form a retaining flange 100. The flange 100 defines a central aperture 102 that receives the upper portion 56 of the connector 52. The flange 100 and tabs 96 cooperate with the connector base portion 54 to retain the connector 52 within the housing 98.

As described above, a sliding contact is made between the base portion 54 and both the flange 100 and the tabs 96 to allow the base portion 54 to move within the housing 98. Additionally, the total diameter of the upper portion of the male connector 52, to include the housing upper portion 56 and the outer conductor 74 is less than the diameter of the flange aperture 102. Similarly, the outside diameter of the housing base portion 54 is less than the inside diameter of the sensor housing 98. Accordingly, the male connector 52 is free to move in any radial direction relative to the housing 98, as illustrated by the double headed arrows in FIGS. 4 and 5. Because he tabs 96 and flange 100 support and retain the male connector 52 within the sensor housing 98, the support ring 64 shown in the earlier embodiment illustrated in FIGS. 2 and 3 is not needed.

Figure 6:
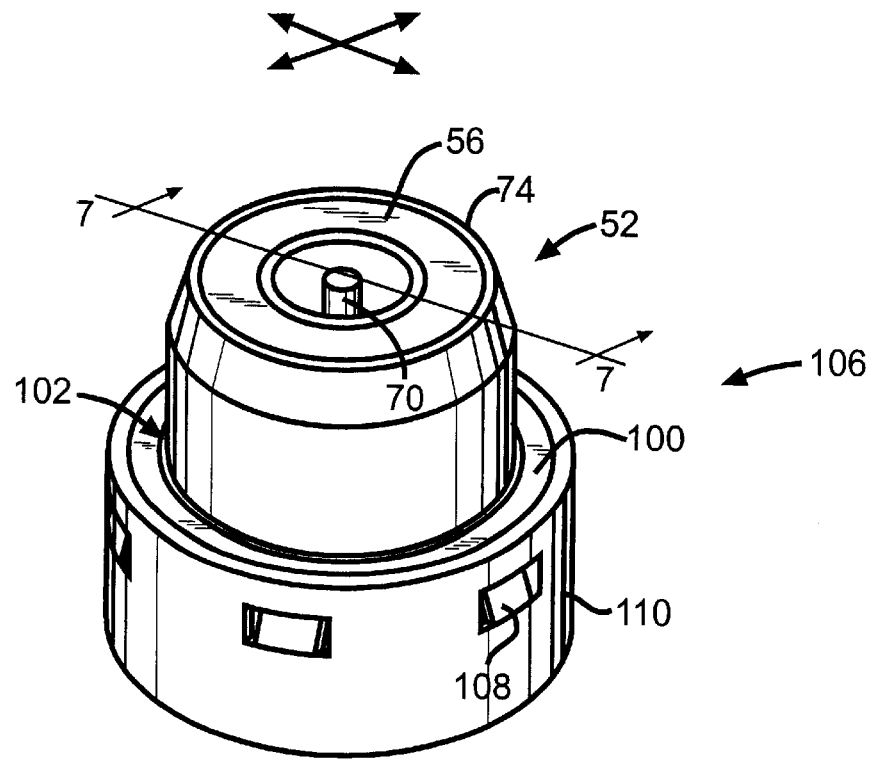
FIG. 6 is a perspective view of another alternate embodiment of the connector shown in FIG. 2.
Figure 7:
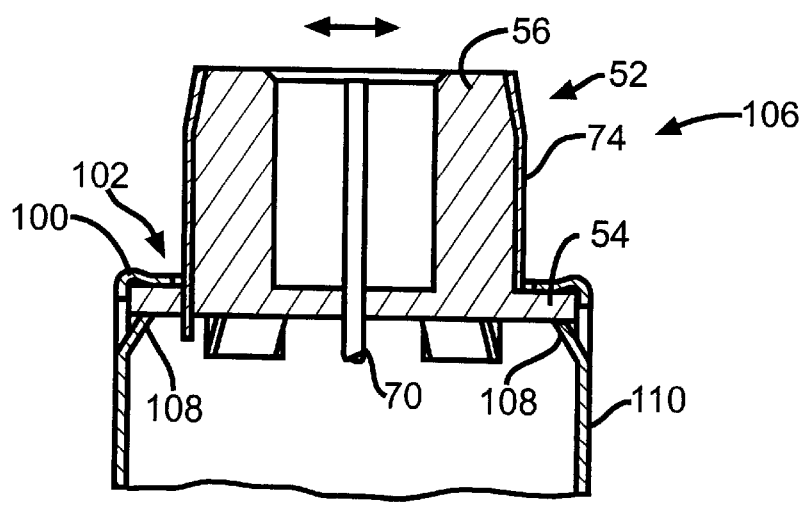
FIG. 7 is a sectional view of the connector taken along line 6—6 in FIG. 6.

A second alternate embodiment of the male connector is illustrated generally at 106 in FIGS. 6 and 7. Components in FIGS. 6 and 7 that are similar to components shown in FIGS. 5 and 6 have the same numerical identifiers. The embodiment 106 is similar to the embodiment shown in FIGS. 5 and 6, and includes a plurality of tabs 108 formed in the upper end of a sensor housing 110. As above, the housing 110 is foreshortened. However, the tabs 108 form an acute angle with the housing 110 instead of being generally perpendicular thereto, as described above. Accordingly, as shown in FIG. 7, the base portion of the connector 54 may lose contact with one or more of the tabs 108 as the male connector 52 moves relative to the housing 110. Therefore, a sufficient number of tabs 108 are provided to retain the connector 52 within the end of the housing 110 with the total number needed being a function of the angle formed between the tabs 108 and the housing 110.

Figure 8:
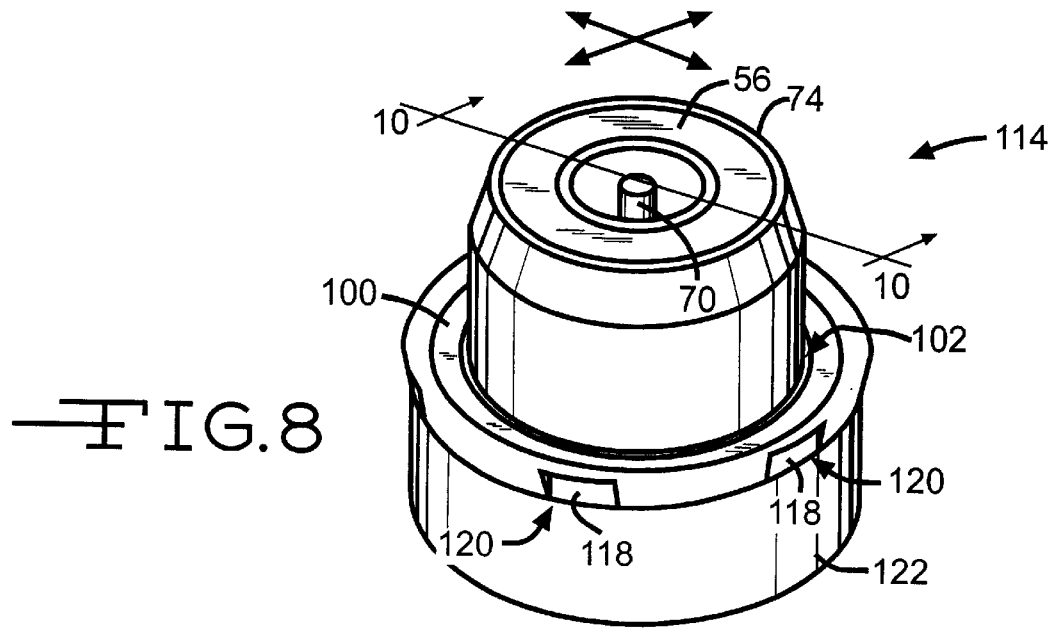
FIG. 8 is a perspective view of another alternate embodiment of the connector shown in FIG. 2.
Figure 9:
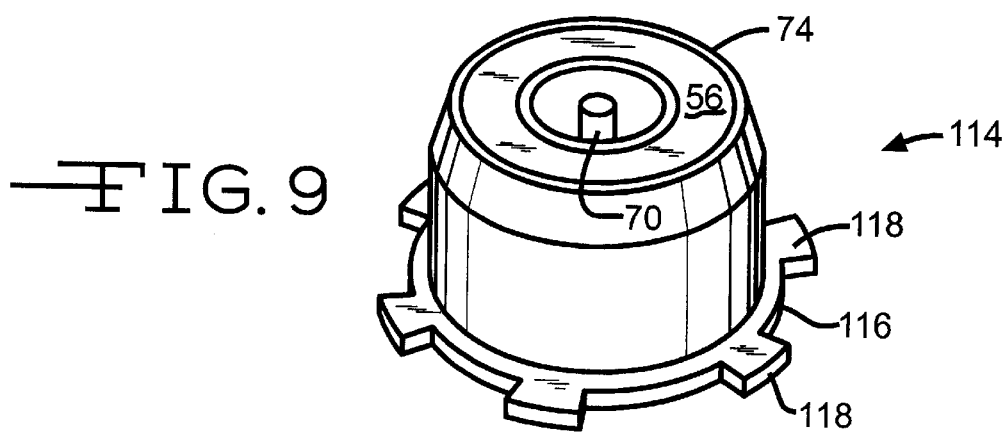
FIG. 9 is a perspective view a male connector that is included in FIG. 8.
Figure 10:
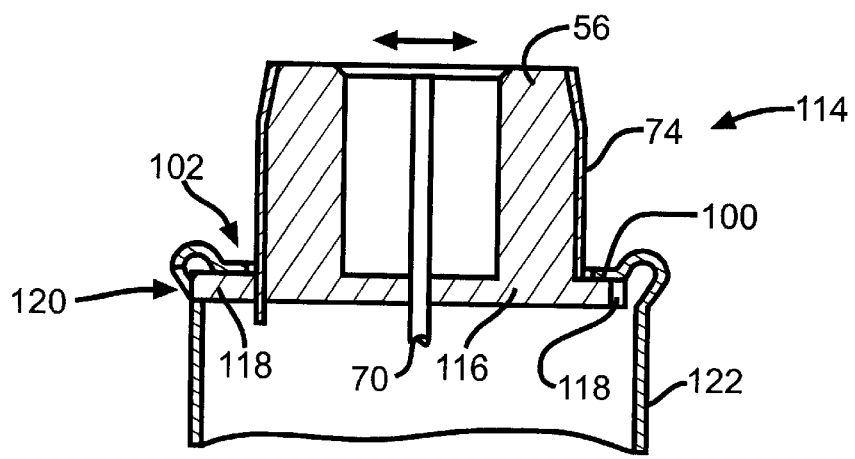
FIG. 10 is a sectional view of the connector taken along line 10—10 in FIG. 8.

A third alternate embodiment of the male connector is illustrated generally at 114 in FIGS. 8 through 10. Components in FIGS. 8 through 10 that are similar to components shown in the earlier figures have the same numerical identifiers. As best seen in FIG. 9, the connector 114 includes a modified housing base portion 116 that includes a plurality of tabs 118 extending in an outward radial direction therefrom. The tabs 118 are spaced equally about the circumference of the base 116. Each tab 118 is slidingly received by and extends through a corresponding slot 120 formed through the side of the upper end of a sensor housing 122. The combination of the tabs 118 and slots 120 co-operate with the retaining flange 100 formed in the upper end of the housing 122 to retain the connector 114 within the housing 122. As before, the base and upper portions of the connector 114 are sized to allow movement of the connector 114 in any radial direction relative to the housing 122.

Figure 11:
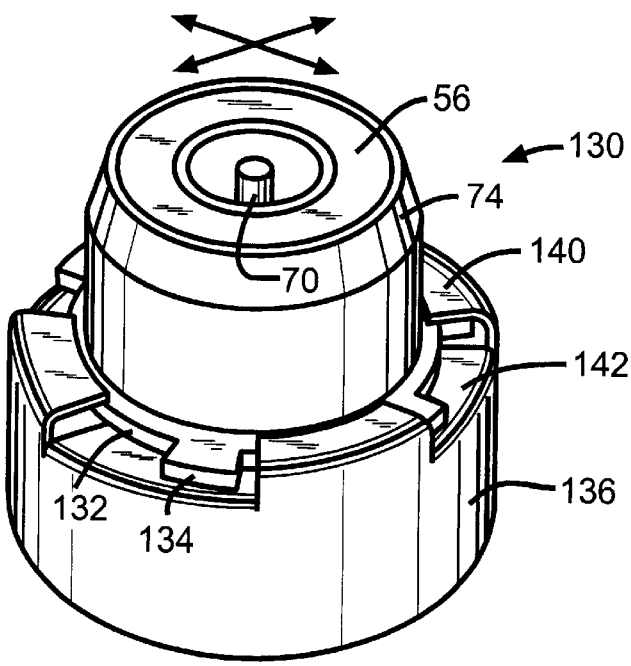
FIG. 11 is a perspective view of another alternate embodiment of the connector shown in FIG. 2.
Figure 12:
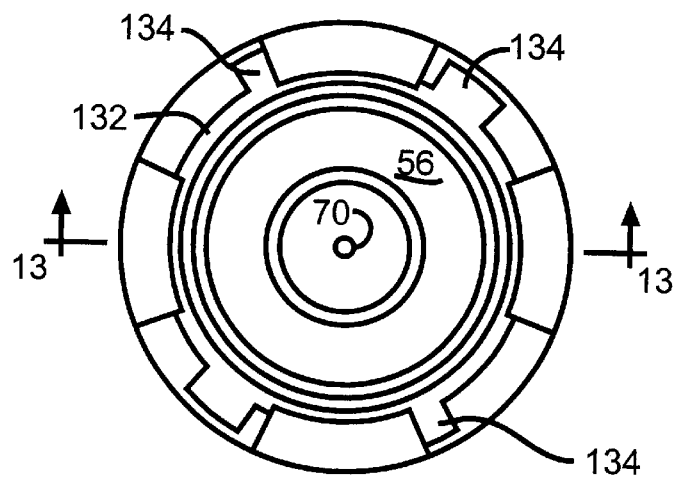
FIG. 12 is a plan view of the connector shown in FIG. 11.
Figure 13:
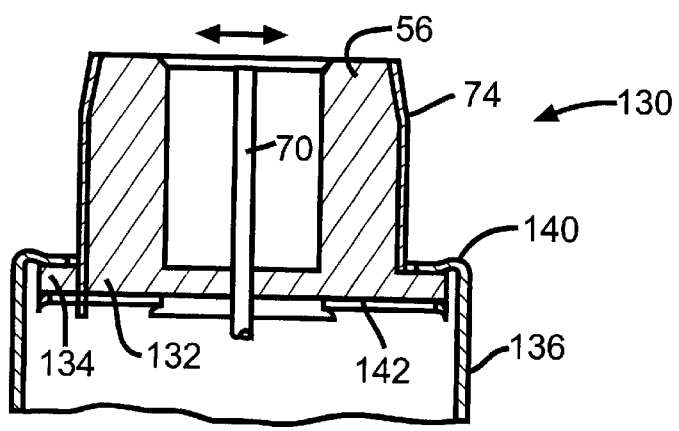
FIG. 13 is a sectional view of the connector taken along line 13—13 in FIG. 12.

A fourth alternate embodiment of the male connector is illustrated generally at 130 in FIGS. 11 through 13. Components in FIGS. 11 through 13 that are similar to components shown in the earlier figures have the same numerical identifiers. Similar to the connector 114 described above, the connector 130 includes a modified base portion 132 that includes a plurality of tabs 134 extending radially therefrom. The connector 130 is received by the upper end of a modified sensor housing 136. The upper end of the housing 136 is formed into a plurality of alternating upper and lower retaining tabs, labeled 140 and 142, respectively. As best seen in FIG. 13, the upper and lower tabs 140 and 142 are spaced axially apart sufficiently to slidingly receive the base portion tabs 134 therebetween. The base portion tabs 134 are sized such that the diameter of a circle circumscribing the outer ends of the tabs 134 would be less than the inside diameter of the sensor housing 136. Accordingly, the connector 130 can move in any radial direction relative to the housing 136 as shown by the double headed arrows in FIGS. 11 and 13. Alternately, a circumferential flange (not shown) can be formed extending from the outer edge of the base portion 132. The flange would be slidingly received between the upper and lower retaining tabs, 140 and 142.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment has been illustrated and described for an ABS, the invention also can be practiced with Traction Control and Vehicle Stability Control Systems.

What is claimed is:

1. An electrical connector comprising:

a cylindrical outer housing having an inside diameter, said outer housing having an axis;

an inner housing having a disc shaped base portion disposed within said outer housing, said inner housing base portion having a diameter that is less than said inside diameter of said outer housing, said inner housing being movable relative to said outer housing in a direction that is generally perpendicular to said outer housing axis; and at least one electrical conductor carried by said inner housing.

2. The electrical connector according to claim 1 wherein said outer housing has an end that extends in an inward radial direction to form a flange, said flange defining an aperture in an end of said outer housing, said flange extending over a portion of said inner housing base portion to retain said inner housing base portion within said outer housing and further wherein said inner housing includes a conductor portion formed integrally with said base portion, said conductor portion extending axially from said inner housing base portion through said outer housing aperture, said conductor portion carrying said electrical conductor.

3. An electrical connector comprising:

a cylindrical outer housing having an inside diameter, said outer housing has an end that extends in an inward radial direction to form a flange, said flange defining an aperture in an end of said outer housing;

an inner housing having a disc shaped base portion disposed within said outer housing, said inner housing base portion having a diameter that is less than said inside diameter of said outer housing, said flange extending over a portion of said inner housing base portion to retain said inner housing base portion within said outer housing, said inner housing including a conductor portion that extends axially from said inner housing base portion through said outer housing aperture with said inner housing being movable relative to said outer housing; and at least one electrical conductor carried by said inner housing, said electrical conductor extending through said outer housing aperture with said inner housing conductor portion; and a portion of flex circuit that carries at least one conductive trace, said conductive trace having a first end electrically connected to said electrical conductor carried by said inner housing and a second end electrically connected to an electrical component disposed within said outer housing.

4. The electrical connector according to claim 3 wherein said outer housing has an axis and said inner housing base portion is movable in a plane that is generally perpendicular to said outer housing axis.

5. The electrical connector according to claim 4 wherein said outer housing is a pressure sensor housing.

6. The electrical connector according to claim 5 further including an annular spacer disposed within said outer housing end having said retaining flange with said inner housing base portion disposed between said spacer and said outer housing retaining flange, said spacer slidably contacting said inner housing base portion and cooperating with said retaining flange to retain said inner housing base portion within said outer housing.

7. The electrical connector according to claim 5 further including a plurality of tabs formed in said sensor housing, said tabs extending inward toward said sensor outer housing axis with said inner housing base portion disposed between said tabs and said outer housing retaining flange, said tabs slidably contacting said inner housing base portion and cooperating with said retaining flange to retain said inner housing base portion within said sensor outer housing.

8. The electrical connector according to claim 7 wherein said tabs are generally perpendicular to said outer housing axis.

9. The electrical connector according to claim 5 wherein said inner housing base portion includes a plurality of tabs formed about the circumference of said base portion, said tabs extending in a radial outward direction from said base portion, and further wherein said outer housing has a plurality of slots formed therethrough, each of said slots slidably receiving one of said base portion tabs whereby said inner housing is retained within said outer housing.

10. The electrical connector according to claim 1 wherein said outer housing includes a first plurality of inwardly extending tabs formed about an end thereof and a second set of inwardly extending tabs formed about said outer housing end that are axially offset from said first set of tabs, said first and second sets of tabs slidably receiving an edge of said base portion of said inner housing therebetween whereby said inner housing is retained within said outer housing.

11. The electrical connector according to claim 10 wherein said inner housing base portion includes a plurality of tabs formed about the circumference thereof, said tabs extending in a radial outward direction from said base portion, and further wherein said base portion tabs are slidably received between said first and second pluralities of outer housing tabs whereby said inner housing is retained within said outer housing.

12. The electrical connector according to claim 6 wherein said inner conductor portion and said electrical conductor are included in a coaxial connector.

13. The electrical connector according to claim 12 wherein said coaxial connector is a male connector and further wherein the connector also includes a female coaxial connector that is adapted to be mounted upon a circuit substrate, said male coaxial connector cooperating with said female coaxial connector to form an electrical connection, said male coaxial connector being movable relative to said outer housing to accommodate stack up tolerances of electrical components.

14. The electrical connector according to claim 12 wherein said coaxial connector is a female connector and further wherein the connector also includes a male coaxial connector that is adapted to be mounted upon a circuit substrate, said female coaxial connector cooperating with said male coaxial connector to form an electrical connection, said female coaxial connector being movable relative to said outer housing to accommodate stack up tolerances of electrical components.

15. The electrical connector according to claim 6 wherein said pressure sensor is included in an anti-lock brake system.

16. The electrical connector according to claim 6 wherein said pressure sensor is included in a traction control system.

17. The electrical connector according to claim 6 wherein said pressure sensor is included in a vehicle stability control system.

* * * * *